United States Patent [19]

Bennett

[11] Patent Number: 4,710,005

[45] Date of Patent: Dec. 1, 1987

[54] CAMERA FLASH MOUNT

[76] Inventor: Robert E. Bennett, 31411 Donnelly, Garden City, Mich. 48135

[21] Appl. No.: 835,729

[22] Filed: Mar. 3, 1986

[51] Int. Cl.⁴ ............................................. G03B 15/05
[52] U.S. Cl. .................. 354/126; 354/145.1; 362/3
[58] Field of Search ..................... 354/126, 145.1, 293; 362/3

[56] References Cited

U.S. PATENT DOCUMENTS

| | | | |
|---|---|---|---|
| 2,599,269 | 6/1952 | Markle | 354/126 |
| 3,289,563 | 12/1966 | Kent | 354/293 |
| 3,893,145 | 7/1975 | King | 354/293 |
| 4,051,493 | 9/1977 | Nakagawa et al. | 354/126 |
| 4,091,402 | 5/1978 | Siegel | 354/293 |

Primary Examiner—A. A. Mathews
Attorney, Agent, or Firm—Brooks & Kushman

[57] ABSTRACT

A flash or strobe light support for a camera having a pair of members connected together to form a handle, a lower bracket for connecting the handle to the base of the camera, and an upper bracket for supporting the strobe light on the upper end of the handle.

One of the handle members has a tubular end with a slot. The end of the other handle member is received in the tubular end and is connected by a pivot member to the tubular member so as to be movable to a position at right angles of the tubular member by being pivoted into the slot and locked in position by the pivot member. The strobe light can thus be moved from an upper position above the camera to a position at right angles, depending upon the position the user wants to locate the light with respect to the subject being photographed.

7 Claims, 8 Drawing Figures

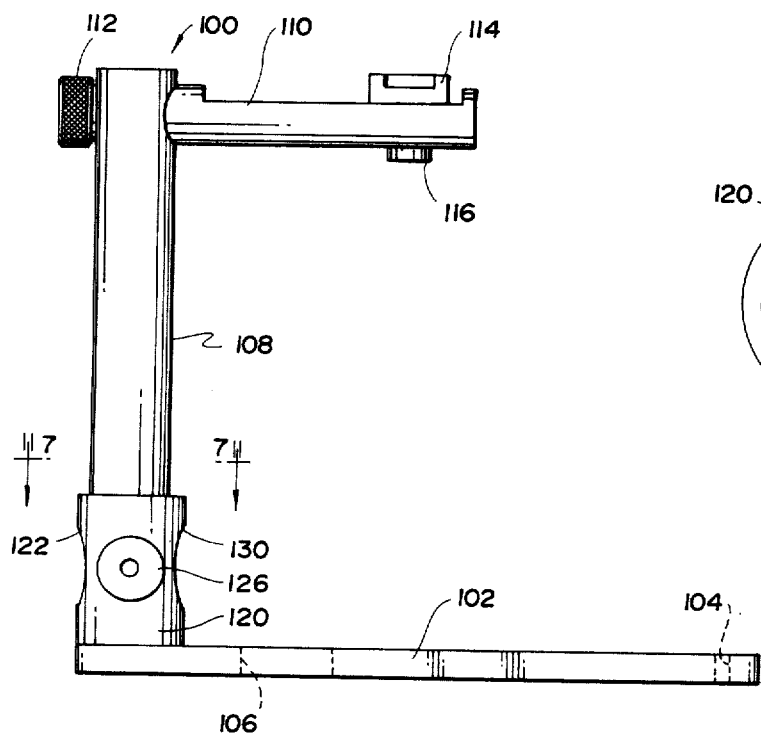
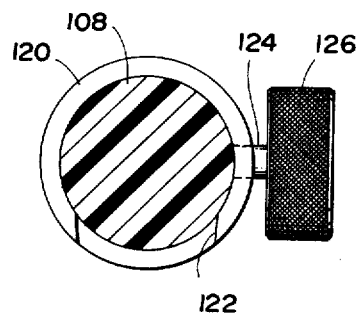
Fig. 7
Fig. 6
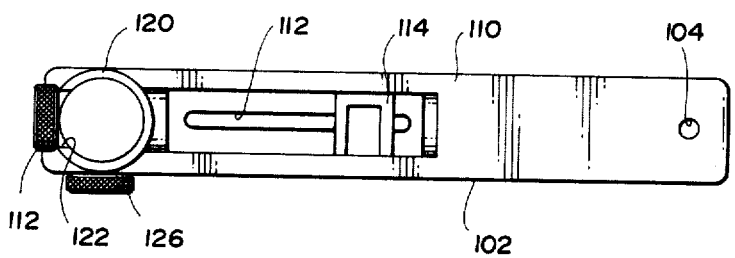
Fig. 8

CAMERA FLASH MOUNT

BACKGROUND OF THE INVENTION

This invention is related to fixtures for supporting a strobe light or flash light attachment on a camera, and more particularly to such a fixture which attaches to the bottom of the camera and forms a handle for the user to support the camera in a shooting position. The handle is formed of a pair of cooperating elements for moving the strobe light between a pair of positions, depending upon the position of the camera shot being made.

Some strobe lights are mounted directly on a camera, however, to avoid the light from producing what is known as "red eye" in some portrait shots, it is desirable to off-set the strobe light or flash bulb attachment from its usual position. This is usually achieved by some sort of bracket attached to the camera to support the strobe light. Usually such attachments or fixtures are relatively complicated, bulky, and difficult to adjust.

SUMMARY OF THE INVENTION

The broad purpose of the present invention is to provide an improved strobe or flash light fixture for a camera. In the preferred embodiment of the invention, the fixture comprises a base member that is fastened to the bottom of the camera. A pair of cooperating handle members are mounted in an upright position alongside the camera on the base member, to form a handle for the user to support the camera. The upper member is connected to a bracket for supporting the strobe light. The two handle members are pivotally connected together so the strobe light can be moved from an upper position to a lower position, which is useful when the user wants to rotate the camera 90 degrees in order to change the position of the film with respect to the subject being photographed.

The two handle members are connected together by a threaded pivot. One of the handle members has a tubular end receiving the other, inner handle member in a first locking position in which the threaded pivot locks the two members together. To reposition the strobe light with respect to the camera, the user pulls the inner member from the tubular end, pivots it 90 degrees such that it passes between the sidewalls of a slot, and then pushes the end of the inner member into a pair of aligned openings in the tubular end to securely connect the two handle members in their alternate position. The pivot is then tightened to lock the two handle members together.

Thus, the preferred embodiment of the invention provides means for not only readily holding the camera in either of its alternate positions, but also provides means for relocating the position of the light with respect to the camera lens.

The first embodiment of the invention is useful for mounting on a conventional 35 millimeter camera having a bottom fastening opening. Another embodiment of the invention is illustrated for other types of commercial cameras.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 6 is a view of another embodiment of the invention;

FIG. 7 is a view as seen along lines 7—7 of FIG. 6; and

FIG. 8 is a plan view of the embodiment of FIG. 6.

DESCRIPTION OF THE PREFERRED EMBODIMENT

Figure 1:
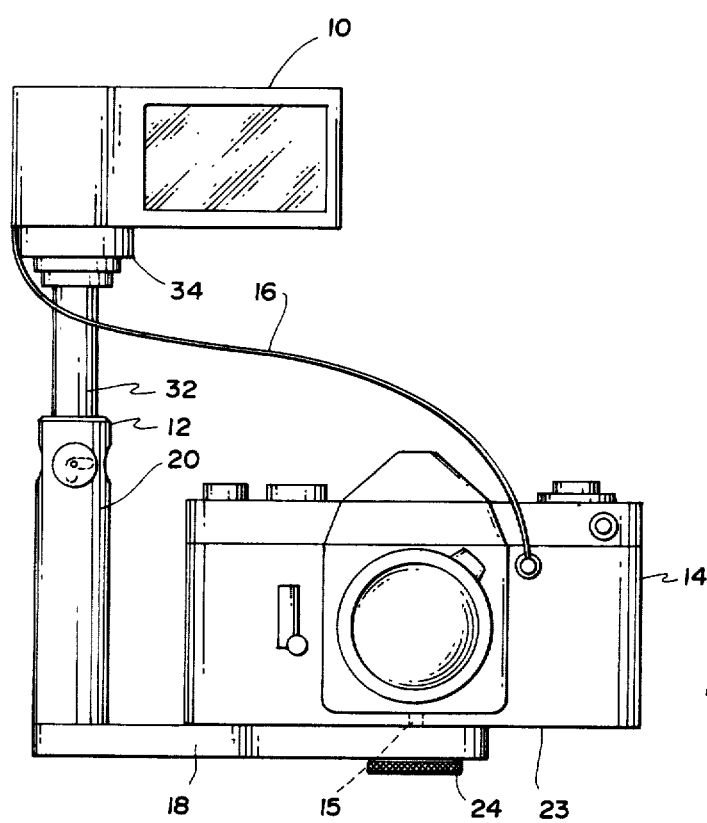
FIG. 1 is a view of a preferred fixture supporting a strobe light on a conventional 35 millimeter camera.

Referring to the drawings, FIG. 1 illustrates a conventional strobe light 10 mounted by fixture 12 to the base of conventional 35 millimeter camera 14. The strobe light is electrically connected by cord means 16 to a battery, not shown, in the camera case in the conventional manner.

Fixture 12 preferably comprises a plastic base 18 connected to the lower end of a first member shaped like an elongated handle 20. Camera 14 has a conventional bottom threaded opening 15.

Figure 3:
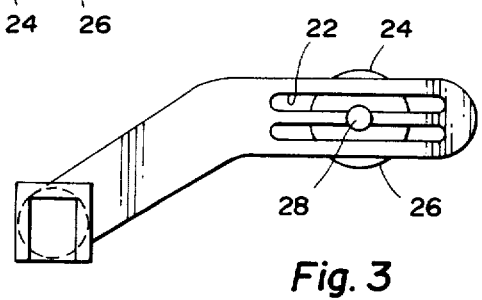
FIG. 3 is a plan view of the base of the fixture.

Referring to FIG. 3, base 18 has an "H" shaped slot 22 adjacent the bottom threaded opening of the camera. A threaded fastener 24, having enlarged head 26, has a threaded tip 28 passed through slot 22 and is threadably received into the bottom opening of the camera. Slot 22 permits the user to adjust the distance between handle 20 and the camera, as well as to adjust the relative position of the handle, that is, forwardly or rearwardly of the camera. Threaded tip 28 of the fastener has a diameter slightly larger than the width of the legs of slot 22, and a midsection (not shown) that is slightly narrower than the width of the legs of slot 22 to accommodate adjusting the handle with respect to the camera case.

Figure 4:
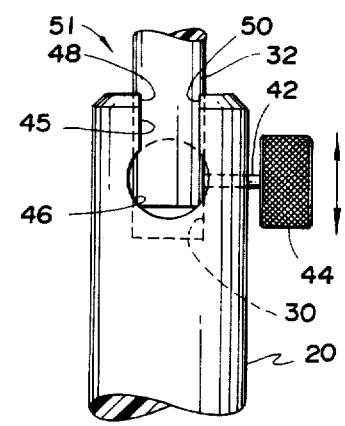
FIG. 4 is an enlarged view showing the slot in the tubular end.

The lower end of handle 20 is solid while the upper end has an opening forming a cylindrical socket 30, as illustrated in dashed lines in FIG. 4. A second member 32, shaped like a rod, has its lower end slideably received in socket 30, and its upper end supporting a conventional slide 34 on which strobe light 10 is mounted.

The sidewall of the tubular end of handle 20 has fastener slot 36 having a pair of legs 38 and 40. Slot leg 40 is parallel to the longitudinal axis of the handle, while slot leg 38 is at right angles to leg 40. Pivot pin 42 is received through slot 36 and has its inner end threadably connected to member 32. A knurled button 44 is connected to the outer end of pin 42 so that member 32 is pivotal with respect to handle 20.

Member 32 is moveable between an upper position, illustrated in FIG. 4, in which pivot pin end 42 is disposed at the intersection of slots 38 and 40, and a lower position in which pivot pin 42 is disposed at the bottom end of slot 40. Member 32 cannot be pivoted with respect to the handle in this lower position because its lower end is received in socket 30 adjacent the bottom of the socket.

Figure 5:
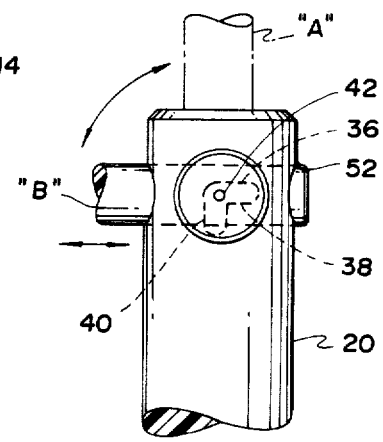
FIG. 5 is a view at right angles to the view of FIG. 4 but with the upper handle member pivoted to its lower position.
Figure 2:
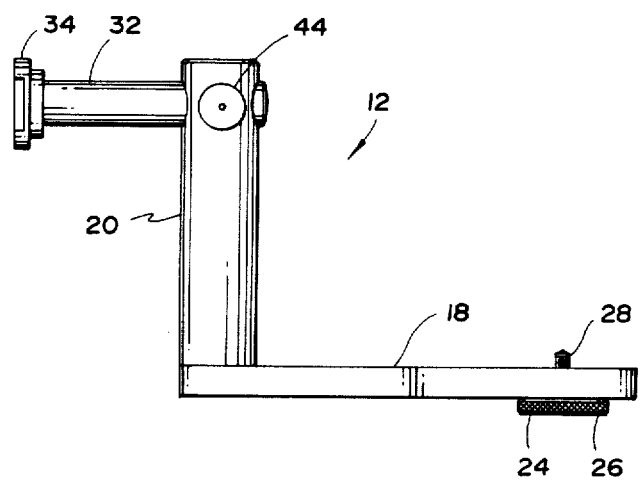
FIG. 2 is a view of the fixture separated from the camera and the strobe light, with one of the handle members moved to the alternate strobe light position.

The tubular end of the handle also has an elongate slot 45 having its upper end terminating in the top opening of the socket and its lower end terminating in enlarged second opening 46 adapted to receive member 32 when it is disposed at right angles to handle 20. The opposite sides 48 and 50 of the first end opening slot 51 of 45 are spaced a distance less than the diameter of member 32. Preferably handle 20 is formed of a resilient, plastic material so that rod-shaped member 32 can be swung down through the sides of the slot, causing them to sprad sufficiently to permit member 32 to be pivoted from the upper position, illustrated at "A" in FIG. 5, to the lower position illustrated at "B" in which the member is received in opening 46. The tubular end of the handle also has a third opening 52 on the opposite side of the handle as opening 46 for receiving the end of member 32 by a motion at right angles to the longitudinal axis of handle 20 in which pivot pin 42 is moved from the intersection of slots 38 and 40 to the outer end of slot leg 38. In this position member 32 is then locked in its alternate position with respect to the handle. Preferably the angular distance of member 32 from position "A" to position "B" is 90 degrees.

In use, base 18 is attached to the bottom of the camera 23 by fastener 24. The strobe light is mounted at the upper end of handle 20. It is then a simple matter to remove the entire fixture and the strobe light from the camera unscrewing fastener 24. If the strobe light is not being used, it can be easily removed from the top of member 32 so that the camera can be manipulated by using handle 20.

FIGS. 6, 7, and 8 illustrate another embodiment of the invention for commercial cameras such as a Hasselblad. This embodiment, generally illustrated at 100, comprises a base 102 having openings 104 and 106 for receiving fasteners for connecting the base to the bottom of the camera. Handle 108 is mounted on the base so as to be supported along the side of the camera case. Arm 110 has one end connected to the upper end of handle 108 by fastener 112. Strobe light slide 114 is locked in position by fastener 116 to arm 110. Referring to FIG. 8, arm 110 has a longitudinal slot 112 for receiving fastener 116 to support the strobe light at an adjusted distance with respect to the camera case.

The handle comprises a short cylinder 120 having its lower end attached to base 102. As best illustrated in FIG. 6, the cylinder has a slot 122 adjacent handle 108. It is to be noted that slot 122 has a width less than the diameter of handle 108. Pivot pin 124 is received through a right angle slot (not shown) in the cylinder wall that is similar to slot 36 of the embodiment of FIG. 5. Handle 108 is pivotable about pin 124 with respect to cylinder wall 120. An adjustment member 126 is connected to the pin for either loosening or tightening handle 108 in the cylinder support. Pin 124 is threadably connected to handle 108 for either tightening or releasing the handle with respect to the cylinder support.

When pin 124 has been released, handle 108 can then be pivoted down from the position, illustrated in FIG. 6, to a horizontal position, generally parallel to base 102. To lock the handle in position the handle is pushed down into the cylindrical support until the handle's bottom end clears slot 122. Fastener 124 is then in a position for locking the handle 108 in its position at right angles to base 102.

When pivoted down to its horizontal position, handle 108 is moved toward the right that is parallel to base 102, until the inner end of the handle is received into opening 130. This prevents the handle from being moved from its position parallel to base 102. Fastener 124 is then tightened to lock the strobe light in its lower position.

Having described my invention, I claim:

1. A strobe light support for a camera, comprising: a first member; a second member; the first member having a tubular end with a first end opening and a sidewall having a slot defined therein, the slot having sides spaced a first distance and being relatively movable, the slot having one end merging into the first end opening and the opposite end of the slot being enlarged to define a second opening having a diameter greater than said first distance; the second member being received in the end opening of the first member in a first position, and being pivotally movable from said end opening through the slot to said second opening to a second position; pivot means connecting the first member to the second member; means for supporting a strobe light on one of said members; and means for attaching the other member to the camera; whereby the strobe light mounted on said one member is movable from said first position to said second position with respect to the camera.

2. A combination as defined in claim 1, in which the second member is movable to a first locked position by a motion parallel to the longitudinal axis of the slot, and to a second locked position by a motion at right angles to said longitudinal axis.

3. A combination as defined in claim 1, in which the tubular end has a longitudinal axis, the second member is movable along said longitudinal axis to a locked position by a motion parallel to the longitudinal axis, and to a second position in a direction at right angles to said longitudinal axis.

4. A combination as defined in claim 3, in which the tubular member has a third opening in the opposite side of the sidewall as the slot, and the second member is receivable in the third opening as it is being moved in the motion at right angles to the slot.

5. A combination as defined in claim 1, in which one of the members is elongated so as to form a handle for supporting the camera, and a base connnected to said elongated handle member which extends therefrom with its longitudinal axis generally perpendicular to the camera base.

6. A combination as defined in claim 1, in which the base of the camera has a threaded opening for receiving a threaded fastener, the base of the support is mounted adjacent the threaded opening, and including a threaded fastener for connecting the base to the threaded opening in the camera.

7. A combination as defined in claim 1, in which the first member is formed of a resilient plastic material to enable the sides of the slot to be relatively movable, the second member being elongated and having a diameter greater than said first distance such that as the second member is moved from its first position toward its second position, it causes the sides to move away from each other, until the second member is received in the enlarged second opening of the slot.

* * * * *

UNITED STATES PATENT AND TRADEMARK OFFICE
CERTIFICATE OF CORRECTION

PATENT NO. : 4,710,005

DATED : December 1, 1987

INVENTOR(S) : Robert E. Bennett

It is certified that error appears in the above-identified patent and that said Letters Patent is hereby corrected as shown below:

Column 3, lines 8 and 9, after "opening", delete "slot" and after "of" and before "45", insert --slot--.

Signed and Sealed this

Fifth Day of July, 1988

Attest:

*Attesting Officer*

DONALD J. QUIGG

*Commissioner of Patents and Trademarks*